Dec. 9, 1969   R. A. ALLIEGRO   3,482,791
REFINER PLATE
Filed Nov. 20, 1967

INVENTOR
RICHARD A. ALLIEGRO
BY
ATTORNEY

United States Patent Office 3,482,791
Patented Dec. 9, 1969

3,482,791
REFINER PLATE
Richard A. Alliegro, Holden, Mass., assignor to Norton Company, Worcester, Mass., a corporation of Massachusetts
Filed Nov. 20, 1967, Ser. No. 684,340
Int. Cl. B02c 7/12; B24d 5/00, 7/00
U.S. Cl. 241—296                3 Claims

ABSTRACT OF THE DISCLOSURE

A refiner plate (e.g. pulp refiner) having a silicon carbide matrix containing a silicon impregnant is produced by firing porous silicon carbide preformed shape in presence of molten silicon; improved performance, low density, and erosion resistance are achieved; silicon carbide, molybdenum silicide, and other metal-silicon alloys can be employed.

BACKGROUND OF THE INVENTION

Field of invention

This invention relates to an improved rotating refiner plate for use in apparatus for the comminution or maceration of solids suspended in a fluid, such as paper making fibers.

Description of the prior art

U.S. Patent 3,117,603 to Van Keuren et al. discloses rotary comminution apparatus in which the working faces of the relatively rotating plates are made of abrasive material such as aluminum oxide, zirconium oxide, or silicon carbide. Although the Van Keuren et al. patent shows how ceramic bonded abrasive materials may be employed in such devices, the abrasive facings have provide to exhibit undue wear caused by cavitational erosion, and so, in spite of their excellent attributes for this application, have not been widely adopted.

SUMMARY OF THE INVENTION

It has been found that the undesirable high rate of erosion of prior art abrasive facings for pulp refiners or other rotary comminution apparatus can be avoided by the use of self bonded granular silicon carbide elements, in which the pores in the structure, between the grains of silicon carbide, are filled with elemental silicon. The resulting structure constitutes what can be described as a continuous phase of matrix silicon carbide with a continuous phase of impregnant distributed throughout the pores of the matrix.

The use of silicon as the impregnant is preferred because of its low density, compatible physical properties, and resistance to erosion.

The refiner elements according to this invention constitute cooperating relatively rotatable elements having lands and grooves in their cooperating faces, which, in operation are adjustably separated by a few thousandths of an inch, as described in U.S. Patent 3,117,603.

The elements can be formed by slip casting, as taught in the patent to Fredriksson, by sludge casting, or by dry pressing. After the molding operation, the green (unfired) shape is dried and is then ready for firing and simultaneous impregnation. The required amount of impregnant in granular or powdered form is placed on the back of the shape (the side away from the lands and grooves) in an amount sufficient to fill the pores in the silicon carbide matrix, which, for the purposes of this invention, varies from 15% by volume of interconnected pores to 30% by volume. The body is then heated in an atmosphere which is inert with respect to the SiC and to the impregnant (e.g. $N_2$, CO, $CO_2$) to the melting temperature, or higher, of the impregnant. For silicon as an impregnant this temperature must be above 2150° C. in order to wet the SiC. The body is held at this temperature for from 15 to 25 minutes, or enough time to effect complete impregnation. The effest of the firing is twofold: (1) to bond the silicon carbide into a continuous matrix by recrystallization whereby the coarse crystals grow at the expense of the fine causing an increase in the size of the pores as the recrystallization progresses; and (2) to fill the pores when the silicon has melted and reduced in surface tension enough to wet the silicon carbide and be drawn into the structure by capillary action. After cooling any excess may be removed, for example, by sand blasting.

Although silicon is preferred as the impregnant, other materials containing silicon such as molybdenum silicides ($MoSi_2$, $Mo_3Si$) tantalum disilicide, tungsten disilicide, and niobium disilicide. For all these except tantalum disilicide, a firing temperature of 2200° C. is satisfactory. For tantalum disilicide 2400° C. is satisfactory. Alternatively, a body of silicon carbide may be formed and fired, then impregnated with an organic material which upon heating will deposit carbon in the pores, and finally exposed to silicon to convert the carbon and silicon to silicon carbide. This process is described in detail in U.S. Patent 3,205,043. The resulting product may be described as a silicon carbide body formed of a self bonded (recrystallized) continuous matrix of silicon carbide, the pores of which are filled with silicon carbide.

An annular ring 11 of silicon carbide, impregnated with elemental silicon is shown.

The face of the plate is provided with grooves 12 and lands 13, designed to coact with complementary grooves and lands in a similar plate when in operation in a comminuting apparatus.

Figure 1:
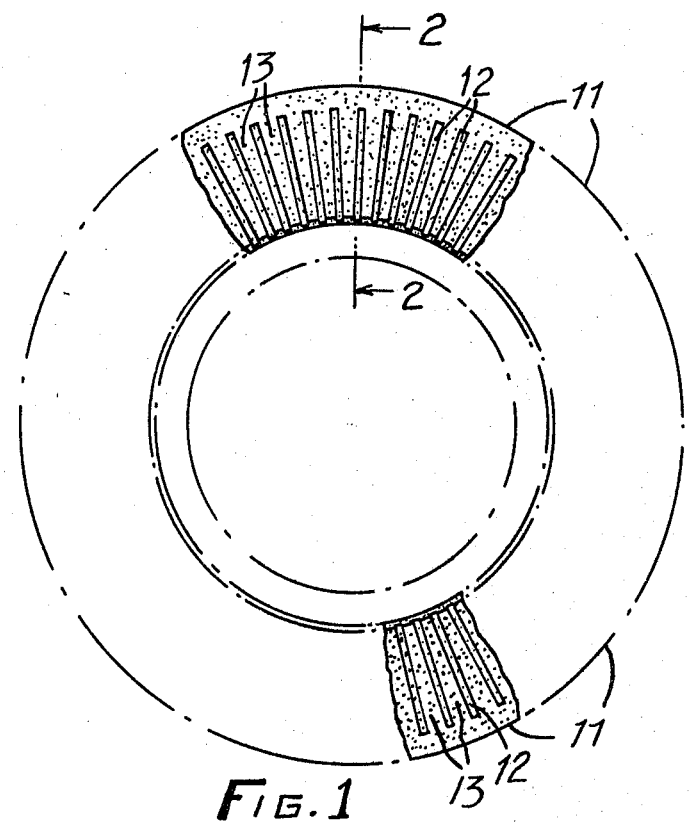
FIGURE 1 shows a top plan view of a typical plate of this invention.
Figure 2:
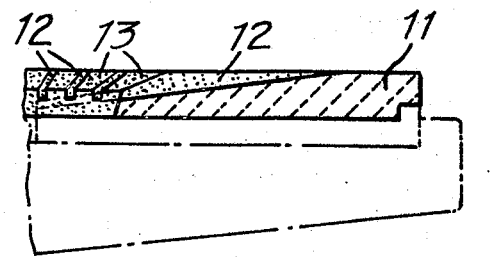

FIGURE 2 is a partial section through line 2—2 of FIGURE 1.

DESCRIPTION OF THE PREFERRED EMBODIMENTS

A mix is prepared as follows:

|  | Parts by weight |
|---|---|
| Silicon carbide, 3–4 micron size particles | 50 |
| Silicon carbide, 100–250 grit (Tyler or U.S. Standard sieves) | 50 |
| Sodium silicate ("N" brand, Philadelphia Quartz Co.) | 0.1 |
| Water | 16 |

The mix is cast into a plaster mold having the desired lands and grooves to produce a shape as shown in FIGURE 1. After removal from the mold the shape is dried at 100° C. for 12 hours. Silicon granules are placed on the back of the shape in an amount equal to 40% of the weight of the green shape, and the body is fired in a nitrogen and CO atmosphere to 2200° C., soaked for 20 minutes, and allowed to cool.

Mixes similar to the above have been made with coarser grains such as 10F and 16F substituted for the 100–250 grit size material.

The finished shapes have a density of from 2.95 to 3.1 g./cc., a porosity of 0 to 2%, 0% permeability to water, a modulus of elasticity of 40 to 50 million p.s.i., and a modulus of rupture of 25,000 to 30,000 p.s.i. Although these shapes had porosities of 0 to 2%, porosities as high as 5% may be utilized in my invention.

What is claimed is:

1. In a fibrillating device for vegetable matter including a plate having lands and grooves, the improvement wherein said plate is formed of a continuous silicon carbide matrix having a porosity between 15 and 30%, said pores being filled with a material selected from the group consisting of silicon, silicon carbide, molybdenum silicide, tantalum disilicide, tungsten disilicide, and niobium disilicide.

2. The improvement as in claim 1 in which said pores are filled to the extent of at least 95%.

3. The improvement as in claim 1 in which the pore filling material is silicon.

References Cited

UNITED STATES PATENTS

| 2,940,842 | 6/1960 | Phillips | 51—308 X |
| 3,117,603 | 1/1964 | Van Keuren et al. | 146—182 |
| 3,191,876 | 6/1965 | Bidwell | 241—296 |
| 3,321,287 | 5/1967 | Hunsberger et al. | 51—295 |

FRANK T. YOST, Primary Examiner

U.S. Cl. X.R.

51—209, 295